Feb. 3, 1931.  E. G. THOMAS  1,790,883
WEIGHING AND COUNTING SCALE
Filed April 14, 1922
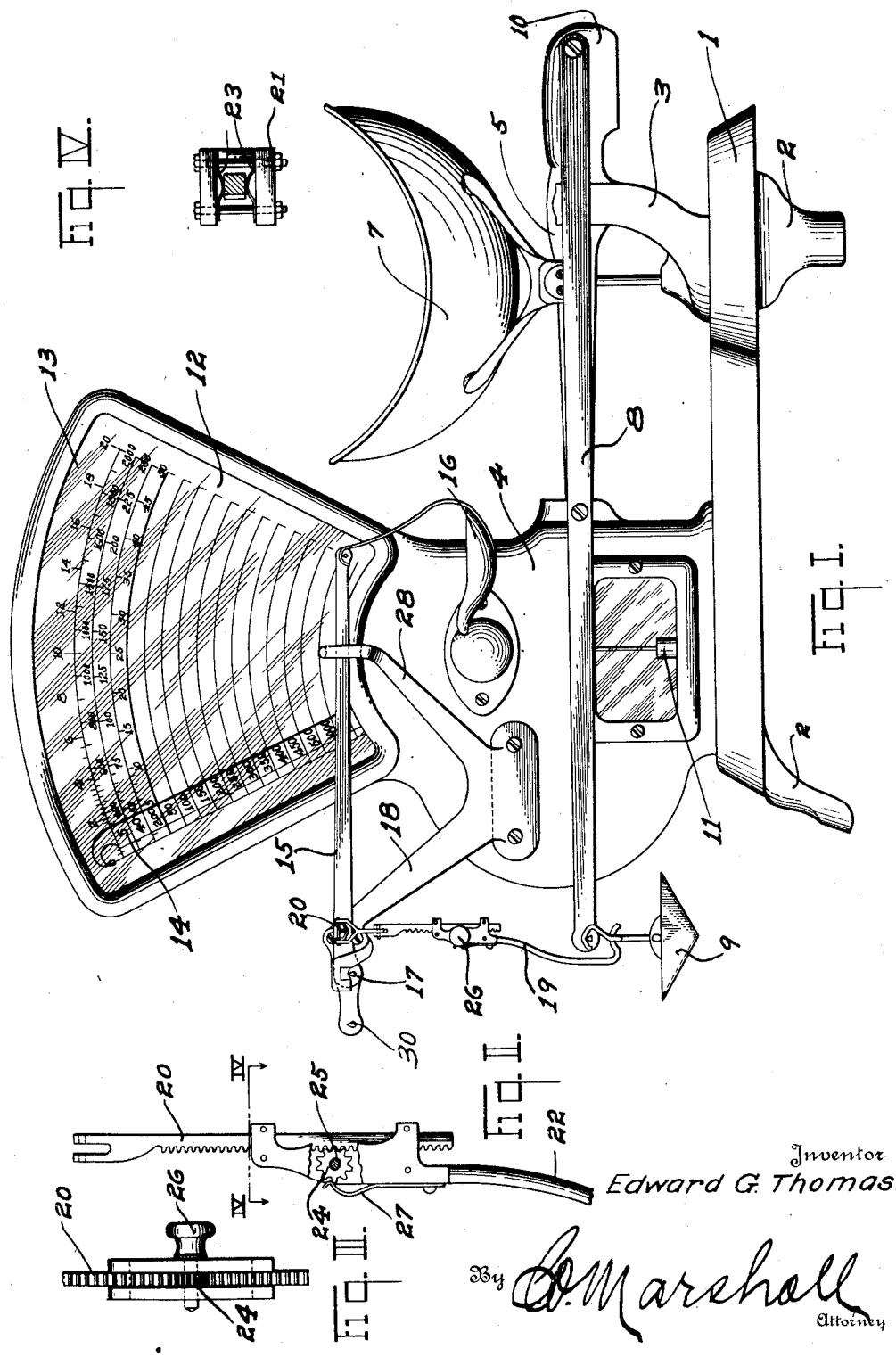
Inventor
Edward G. Thomas.
By  D. Marshall
Attorney Patented Feb. 3, 1931

1,790,883

UNITED STATES PATENT OFFICE

EDWARD G. THOMAS, OF TOLEDO, OHIO, ASSIGNOR TO TOLEDO SCALE MANUFACTURING COMPANY, OF TOLEDO, OHIO, A CORPORATION OF NEW JERSEY

WEIGHING AND COUNTING SCALE

Application filed April 14, 1922. Serial No. 552,765.

This invention relates to weighing and counting scales, and particularly to scales for weighing or counting articles of very light weight. Some of the moving parts of delicate machines, such, for example, as meters for measuring electric current, must be weighed with extreme nicety, not only because the balance of such machines is affected by the weights of the various parts, but because the measurement of the current depends upon the quantity of material contained in some of such parts. It is possible to weight such parts with sufficient accuracy by the use of an even balance scale, but the weighing process when such a scale is used takes a great deal of time, especially if the operator of the scale be unskillful. So much time is required in some cases that the accurate weighing of a dozen light parts may consume an entire day.

One of the objects of this invention is to provide means for weighing light articles with great accuracy which may be operated without excessive consumption of time.

Another object of the invention is the provision of an automatic scale capable of weighing very light articles without excessive movement of the commodity-receiver.

Still another object of the invention is to provide means for weighing and counting articles varying widely in individual weights.

Other objects and advantages will be apparent from the following description, in which reference is had to the accompanying drawings illustrating a preferred embodiment of my invention and wherein similar reference numerals designate similar parts throughout the several views.

In the drawings:—

Figure I is an elevational view of a scale embodying my invention;

Figure II is an enlarged fragmentary detail elevation, with parts broken away, showing an adjusting device which is employed upon the scale illustrated in Figure I;

Figure III is a fragmentary elevational view of part of the adjusting device, the parts being turned at right angles to the position in which they are shown in Figure II; and Figure IV is a still further enlarged detail sectional plan view taken on the line 4—4 of Figure III.

I have shown my invention as applied to an automatic scale of the pendulum type, but it is to be understood that the invention may also be incorporated in scales of other types.

In the illustrative example shown in the drawings, the base 1 of the scale is supported upon legs 2. Supported upon the base 1 adjacent one end thereof is a base horn or fulcrum stand 3, while an upright housing 4 is secured upon the base adjacent its other end. A lever 5 is pivotally supported upon the fulcrum stand 3 and in turn supports a commodity-receiver or scoop 7 and a beam 8, at the end of which is suspended a smaller commodity-receiver or pan 9. The lever 5 is also provided with a counterweight 10 which substantially counterbalances the weight of the lever and the parts carried thereby. Pivotally supported within the housing 4 is a load-offsetting pendulum 11, to which the nose of the lever 5 is so connected that as the scoop 7 or pan 9 is depressed the load-offsetting pendulum 11 is swung upwardly and to the left until a position of balance is reached. The upper part of the housing 4 is provided with a glazed window 12 through which are visible a chart 13 and an indicator hand 14, the indicator hand being fixed to the pendulum 11 so that as the pendulum swings upwardly and to the left the indicator hand swings to the right across the chart. The mechanism so far described is substantially the same as that shown and described in my co-pending application Ser. No. 433,921, filed December 29, 1920, and the load-offsetting and indicating mechanism is of the type shown in the patent to Duquette No. 1,072,599, dated September 9, 1913, and is so widely known that I consider it unnecessary to show or describe it in detail.

The weight of small articles placed in the pan 9 may be determined with a fair degree of accuracy. The weight of very small articles cannot, however, be easily determined by placing them in the pan 9, and the weight of articles cannot be determined with sufficient exactness for some purposes by placing them either in the pan 9 or the scoop 7. I have, therefore, provided the scale of my invention with a second lever 15 which is equipped with an article container 16. The lever 15 is fulcrumed by means of a pivot 17 having its knife edge turned upwardly to a bracket 18 suitably secured upon the housing 4, and is connected to the beam 8 by means of a thrust member 19, the upper end of which is engaged by a knife edge pivot 20 on the lever 15, and the lower end of which engages the link by means of which the pan 9 is suspended from the lever 8.

Since the pan 9 is supported at a point upon the beam 8 remote from its fulcrum, its arc of movement is comparatively long. The pivot 20 at the upper end of the thrust member 19 is located very close to the fulcrum pivot 17 of the lever 15 in order that the leverage of a load in the article container 16 may be very great, and the arc of movement of the lever 15 necessary to impart to the lever 5 sufficient movement to swing the pendulum 11 and indicator 14 across the chart would, if the thrust member 19 were of invariable length, be of such magnitude as to render the scale practically inoperative except for weighing loads of substantially the same weight. I have, therefore, provided means for varying the length of the thrust member 19 so that the lever 15 may remain substantially horizontal while the indicator 14 swings to any position in its range of movement.

The adjusting device consists of a rack 20 forming one part of the thrust member 19 and slidably mounted in a bracket 21 which is fixedly mounted upon another part 22 of the thrust member 19, the sides of the rack being frictionally engaged by flat springs 23 mounted in the bracket 21, in the manner shown in Figure IV. A pinion 24 is fixed upon the shaft 25 which is journaled in the bracket 21 and provided with a manipulating knob 26, the pinion 24 being in mesh with the rack 20 so that when the knob 26 is turned the rack is moved upwardly or downwardly. A spring detent 27 engages the pinion 24 and serves to hold it against accidental movement. The bracket 18 is provided with a forked arm 28, the furcations of which lie above and below the lever 15 to limit its swinging movement.

When the device is to be used for weighing a very small article, the article to be weighed is placed in the container 16 and its weight causes the lever 15 to swing downwardly against the lower furcation of the bracket 28. The knob 26 may then be turned to force the free end of the beam 8 downwardly and thus swing the pendulum 11 upwardly until the upward pull exerted by the pendulum 11 on the lever 5 and beam 8 is sufficient to raise the free end of the lever 15 away from the furcation against which it has rested. The scale will then be in a position of balance with the indicator hand 14 standing somewhere between its zero and full capacity positions. The value of the graduation with which the indicator registers is then divided by 100 to find the weight of the article in the container 16, the levers being so proportioned that a given weight in the container 16 will exert 100 times as much force on the pendulum mechanism as the same weight in the scoop 7. If the scale is employed as a counting scale, the indicated count should be divided by 100 for the same reason.

It will be noted that in the illustrated example the weighing capacity of the chart is 20 lbs.—that is to say, a 20 lb. load in the scoop 7 will swing the indicator entirely across the chart, the parts being so proportioned that a 2 lb. load in the pan 9 or a load weighing .2 of a pound in the container 16 will likewise swing the indicator entirely across the chart. If it be desired to weigh with great accuracy a load weighing more than .2 of a pound, it may be placed in the container 16 and a part of its weight counterbalanced by hanging a known weight from the pivot 30.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a weighing scale, in combination, a substantially horizontally extending lever, an article container supported thereby, means on said lever for supporting a counterpoise for offsetting a portion of the load on said article container, automatic means for offsetting another portion of such load, a connection between said lever and said automatic means, and means whereby said connection may be adjusted in length sufficiently to permit said lever to remain in a substantially horizontal position notwithstanding change in the position of said automatic load-offsetting mechanism from zero to full capacity position.

2. In a weighing scale, in combination, automatic load-offsetting mechanism, a container for articles to be weighed, a substantially horizontally extending lever supporting said container, means connecting said lever and said automatic load-offsetting mechanism, and means for lengthening or shortening said connecting means sufficiently so that said lever is maintained in substantially horizontal position notwithstanding change in the position of said load-offsetting mechanism from zero to full capacity position.

3. In a weighing scale, in combination, automatic load-counter balancing mechanism, an article container, a substantially horizontally extending lever supporting said article container, and manually extensible means connecting said automatic load-counterbalancing mechanism and said lever, said manually extensible means being sufficiently extensible so that said lever may be maintained in substantially horizontal position notwithstanding change in the position of said automatic load-counterbalancing mechanism from zero to full capacity position.

4. In a weighing scale, in combination, automatic load-offsetting mechanism, an article container, a substantially horizontally extending lever supporting said article container and connected to said automatic load-offsetting mechanism, and means for maintaining said lever substantially horizontal notwithstanding change in the position of said automatic load-offsetting mechanism from zero to full capacity position.

5. In a weighing scale, in combination, a substantially horizontally extending lever, an article container supported thereby, means on said lever for supporting a counterpoise for offsetting a portion of the load in said article container, automatic means for offsetting another portion of such load, and an extensible connection between said lever and said automatic means whereby said lever may be maintained in substantially horizontal position notwithstanding change in the position of said automatic load-offsetting mechanism from zero to full capacity position.

6. In a weighing scale, in combination, a substantially horizontally extending lever, an article container supported thereby, means on said lever for supporting a counterpoise for offsetting a portion of the load in said article container, automatic means for offsetting another portion of such load, and a manually extensible connection between said lever and said automatic means whereby said lever may be maintained in substantially horizontal position notwithstanding change in the position of said automatic load-offsetting mechanism from zero to full capacity position.

7. In a weighting scale, in combination, an article container, automatic load-offsetting mechanism, oppositely extending levers, means connecting one of said levers to said article container, means connecting the other of said levers to said automatic load-offsetting mechanism, and extensible means connecting said levers to each other.

8. In a weighing scale, in combination, two levers connected in series, means connecting said levers consisting essentially of a rack bar connected to one of said levers, a link connected to the other of said levers and slidably engaged with said rack bar, a pinion on said link meshing with the teeth of said rack bar, means for manually rotating said pinion to move said rack bar relatively to said link, and means for preventing accidental relative movement of said rack bar and said link.

EDWARD G. THOMAS.